C. R. TERRELL.
PUNCTURE REPAIR PLUG.
APPLICATION FILED MAY 17, 1912.
1,071,595.
Patented Aug. 26, 1913.
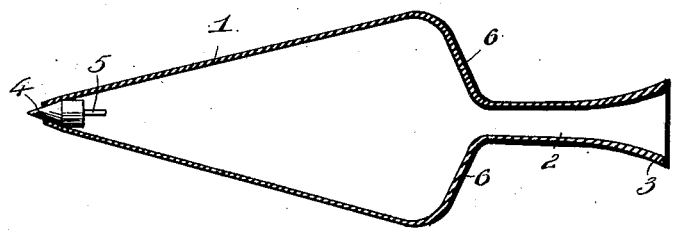
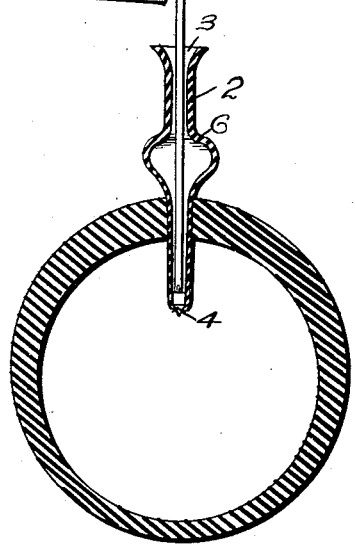
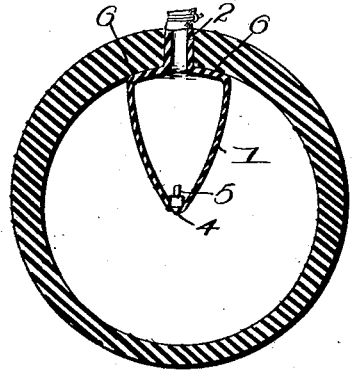
Witnesses
C. E. Kempler,
J. W. Garner
Inventor
Clyde R. Terrell.
By Victor J. Evans
Attorney

UNITED STATES PATENT OFFICE.

CLYDE R. TERRELL, OF MONTESANO, WASHINGTON, ASSIGNOR TO TERRELL MANUFACTURING COMPANY, OF MONTESANO, WASHINGTON, A CORPORATION OF WASHINGTON.

PUNCTURE-REPAIR PLUG.

1,071,595.  Specification of Letters Patent.  Patented Aug. 26, 1913.

Application filed May 17, 1912. Serial No. 697,957.

*To all whom it may concern:*

Be it known that I, CLYDE R. TERRELL, a citizen of the United States, residing at Montesano, in the county of Chehalis and State of Washington, have invented new and useful Improvements in Puncture-Repair Plugs, of which the following is a specification.

This invention is an improved puncture repair plug for pneumatic tires and the like, and consists in the construction, combination and arrangement of devices hereinafter described and claimed.

The object of my invention is to provide an improved plug which is hollow and inflatable and by means of which a puncture in an automobile or other pneumatic tire may be readily and very expeditiously closed.

In the accompanying drawing:—Figure 1 is a longitudinal sectional view of a puncture repair plug constructed in accordance with my invention. Fig. 2 is a sectional view of a pneumatic tire and one of my improved puncture repair plugs, showing the latter while being inserted in the tire. Fig. 3 is a similar view of the same, showing the repair plug in its operative position in the tire.

In the embodiment of my invention, I provide a hollow inflatable substantially conical repair plug 1 which is made of rubber or other suitable material and is provided at its larger end with a contracted neck 2, the outer end of which neck is enlarged as at 3. In the apex of the conical plug is a point 4 which is preferably made of hard leather but may be made of any other suitable material and which, in practice, is cemented in the end of the conical plug. This point has a conical outer portion and is provided at its inner end, which projects into the plug, with a stud 5 which is preferably made of wire.

The conical plug 1 is made of thin rubber of good quality and may be of any suitable size. In practice, I make my plugs of varying sizes, as from one to three or four inches in length. The walls of the neck 2 are thickened as shown and the enlarged end of the plug, which forms the shoulders of the neck is also thickened as at 6. In practice, the walls of the neck and the shoulders thereof are about twice the thickness of the wall of the cone.

When using my improved plug to repair a hole in a tire, the plug is forced through the hole in the tire, is smeared with a good rubber cement, the shoulder 6 is pulled against the inner side of the tire and the plug is inflated. A piece of twine or the like is tied around the neck of the plug, the conical body thereof holding it in place against the puncture. After the tie has been made around the neck the top of the plug is cut off, leaving the neck extending slightly from the outer side of the tire. The tire is then inflated and it will be found that the puncture has been thoroughly repaired. The point 4 of the plug greatly facilitates the insertion of the plug in the tire through the puncture and, in practice, this may be done by means of a suitable punch or rod placed longitudinally in the plug through the neck thereof and having a small opening in the end of the rod to receive the stud 5. After the plug has been put in the tire through the puncture, the rod is, of course, withdrawn.

I claim :—

1. A hollow inflatable puncture plug for pneumatic tires having an opening at one end and a hardened body in the said end and provided with a point which projects outwardly through the said opening in the end of the plug.

2. A hollow inflatable puncture plug for pneumatic tires having a neck at one end and provided at the opposite end with a hardened point, the said hardened point having a stud projecting into the plug toward and arranged opposite the neck.

In testimony whereof I affix my signature in presence of two witnesses.

CLYDE R. TERRELL.

Witnesses:
 A. R. RANKIN,
 W. D. CROW.

Copies of this patent may be obtained for five cents each, by addressing the "Commissioner of Patents, Washington, D. C."